United States Patent
Hudson

(10) Patent No.: US 7,650,206 B2
(45) Date of Patent: Jan. 19, 2010

(54) APPARATUS AND METHOD FOR ENVIRONMENTALLY CONDITIONING A SPACE

(75) Inventor: Brian R. Hudson, Carrollton, IL (US)

(73) Assignee: Lennox Industries Inc., Richardson, TX (US)

(*) Notice: Subject to any disclaimer, the term of this patent is extended or adjusted under 35 U.S.C. 154(b) by 169 days.

(21) Appl. No.: 11/677,817

(22) Filed: Feb. 22, 2007

(65) Prior Publication Data

US 2008/0208392 A1 Aug. 28, 2008

(51) Int. Cl.
*G05B 21/00* (2006.01)
*G01M 1/38* (2006.01)
*G05B 13/00* (2006.01)
*F24F 3/00* (2006.01)
*F24F 7/00* (2006.01)

(52) U.S. Cl. ............ 700/276; 700/277; 165/205; 165/208; 165/209; 165/217; 236/1; 236/49.3; 236/49.4

(58) Field of Classification Search ............ 700/276, 700/277, 299, 300; 165/205, 208, 209, 217; 236/49.1, 49.3, 49.4

See application file for complete search history.

(56) References Cited

U.S. PATENT DOCUMENTS

| | | | | |
|---|---|---|---|---|
| 4,475,685 A | * | 10/1984 | Grimado et al. | 236/46 R |
| 4,947,928 A | * | 8/1990 | Parker et al. | 165/208 |
| 5,179,524 A | * | 1/1993 | Parker et al. | 700/277 |
| 5,180,102 A | * | 1/1993 | Gilbert et al. | 236/49.3 |
| 5,348,078 A | * | 9/1994 | Dushane et al. | 165/209 |
| 5,810,245 A | * | 9/1998 | Heitman et al. | 236/49.3 |
| 5,950,709 A | * | 9/1999 | Krueger et al. | 165/11.1 |
| 2003/0216837 A1 | * | 11/2003 | Reich et al. | 700/276 |

\* cited by examiner

*Primary Examiner*—Ronald D Hartman, Jr.

(57) ABSTRACT

An apparatus situated in a space for controlling an air terminal device to affect at least one environmental condition in the space includes: (a) at least one sensor unit for presenting at least one sensed indication related with at least one respective environmental condition of the at least one environmental condition; and (b) a local control unit coupled with the air terminal device and coupled with at least one respective sensor unit of the at least one sensor unit. The local control unit responds to a relationship of at least one predetermined requirement with the at least one sensed indication to effect the controlling.

15 Claims, 5 Drawing Sheets

APPARATUS AND METHOD FOR ENVIRONMENTALLY CONDITIONING A SPACE

BACKGROUND OF THE INVENTION

The present invention is directed to environmental control systems, and especially to environmental control systems affecting environmental conditions in a plurality of spaces and controlled using a network arrangement.

Environmental control networks generally include a central control unit coupled by a network with a plurality of variable air volume units in air ducts serving various conditioned spaces. Sensor units in the conditioned spaces provide indications regarding environmental conditions in the conditioned space. The indications are provided using indicating signals provided to a local control unit located in the air terminal device servicing the conditioned space.

The environmental network serves to control at least one Roof-Top Unit (RTU) or other air conditioning unit in providing conditioned air to a duct system. Air terminal devices may control air flow from the duct system to the conditioned spaces.

One or more environmental conditions in a space may be monitored and may be used for controlling conditioning of the space. A temperature sensor may provide an indicating signal relating to temperature within a space. A relative humidity sensor may provide an indicating signal relating to relative humidity within a space. A motion sensor may provide an indicating signal relating to motion occurring within a space, which may be used to indicate that a space is occupied. A carbon dioxide sensor may provide an indicating signal relating to amount of carbon dioxide within a space, which may be used to indicate how many occupants are in a space. One or more of such sensors in addition to other sensors may be employed to condition a space in view of one or more conditions extant within the space.

Situating electronic control units in air terminal devices for responding to indicating signals from sensor units in conditioned spaces locates electronic control units in areas that require service personnel to access duct systems to perform maintenance actions on the electronic control units. Such accessing of duct systems can be inconvenient, uncomfortable and awkward. Positioning electronic control units in air terminal devices also requires locating electronic units in at least two positions—in the air terminal device (in the duct) and in the sensor unit (in the conditioned space). Such a splitting of electronic functionality and equipment can be costly and inefficient as compared to locating electronic units in a single location.

Another consideration in designing an environmental control system is efficiency of communications in a control network associated with such a system. Fewer required notifications, orders and similar communications traversing the network can contribute to more efficient and faster communications. Higher speed and greater efficiency of communication in a control network can contribute to more efficient operation of an environmental control system.

There is a need for an apparatus and method for environmentally conditioning a space that situates electronic control circuitry in easily accessible single locations.

There is a need for an apparatus and method for environmentally conditioning a space that improves efficiency in communications in control network portions of an environmental control system.

SUMMARY OF THE INVENTION

An apparatus situated in a space for controlling an air terminal device to affect at least one environmental condition in the space includes: (a) at least one sensor unit for presenting at least one sensed indication related with at least one respective environmental condition of the at least one environmental condition; and (b) a local control unit coupled with the air terminal device and coupled with at least one respective sensor unit of the at least one sensor unit. The local control unit responds to a relationship of at least one predetermined requirement with the at least one sensed indication to effect the controlling.

A method for controlling an air terminal device to affect at least one environmental condition in a space includes: (a) Providing at least one sensor unit in the space presenting at least one sensed indication related with at least one respective environmental condition of the at least one environmental condition. (b) Providing a local control unit coupled with the air terminal device and coupled with at least one respective sensor unit of the at least one sensor unit. (c) Operating the local control unit to respond to a relationship of at least one predetermined requirement with at least one sensed indication to effect the controlling.

It is, therefore, a feature of the present invention to provide an apparatus and method for environmentally conditioning a space that situates electronic control circuitry in easily accessible single locations.

It is also a feature of the present invention to provide an apparatus and method for environmentally conditioning a space that improves efficiency in communications in control network portions of an environmental control system.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
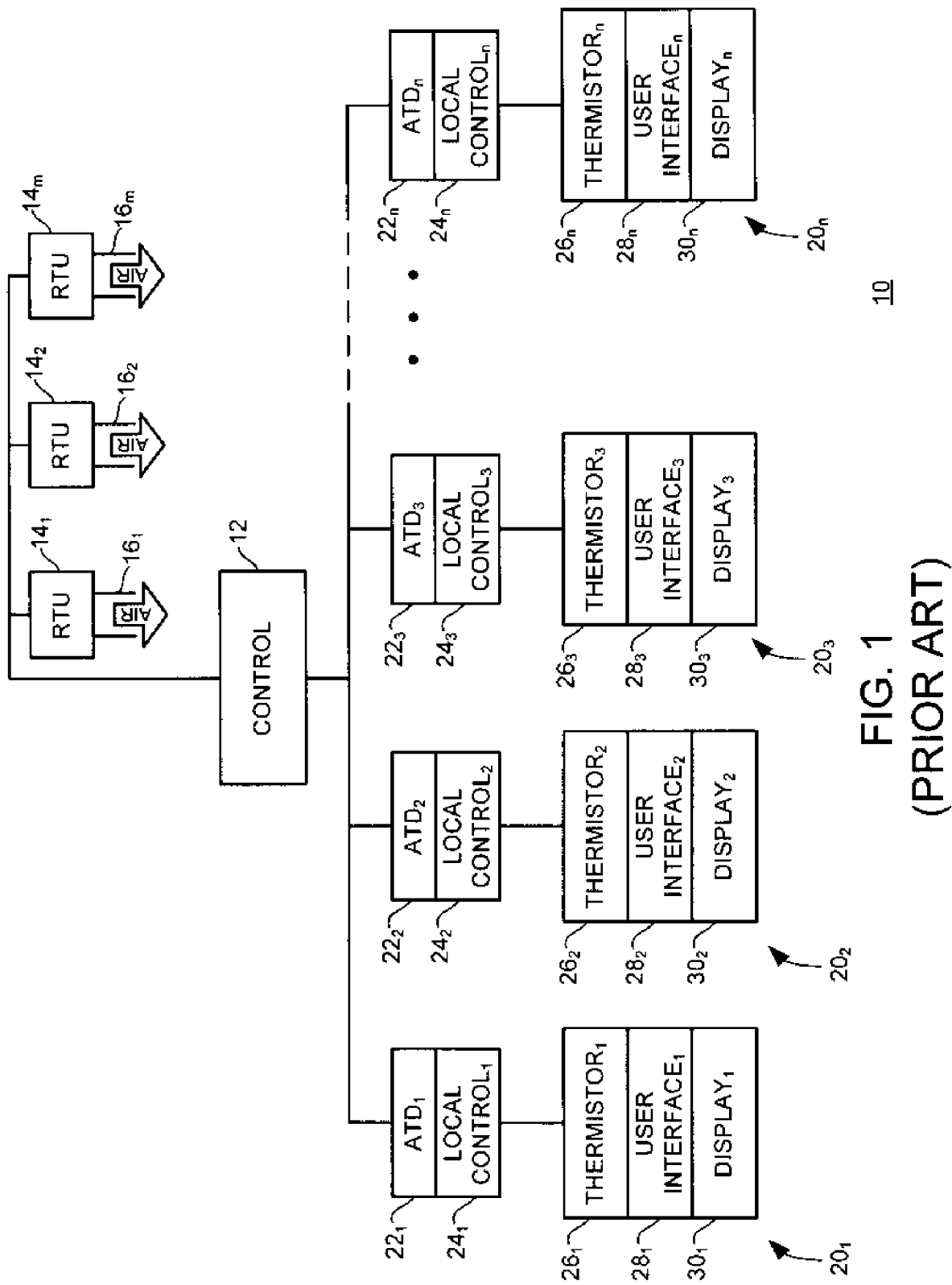
FIG. 1 is a schematic diagram of a prior art environmental control system.

FIG. 1 is a schematic diagram of a prior art environmental control system. In FIG. 1, an environmental control system 10 includes a master control unit 12 coupled with a plurality of Roof Top Units (RTU) $14_1$, $14_2$, $14_m$. The indicator "m" is employed to signify that there can be any number of RTUs in environmental control system 10. The inclusion of three RTUs $14_1$, $14_2$, $14_m$ in FIG. 1 is illustrative only and does not constitute any limitation regarding the number of RTUs that may be included in environmental control system 10. RTU $14_1$ is coupled with an air duct $16_1$ for distributing conditioned air among selected spaces conditioned by environmental control system 10. RTU $14_2$ is coupled with an air duct $16_2$ for distributing conditioned air among selected spaces conditioned by environmental control system 10. RTU $14_m$ is coupled with an air duct $16_m$ for distributing conditioned air among selected spaces conditioned by environmental control system 10. Connections of duct systems $16_1$, $16_2$, $16_m$ with serviced spaces are not shown in detail in FIG. 1 but such connections are understood by those skilled in the art of environmental control system design.

Associated with each conditioned space served by environmental control system 10 is a local space system $20_1$, $20_2$, $20_3$, $20_n$. The indicator "n" is employed to signify that there can be any number of local space systems in environmental control system 10. The inclusion of four local space systems $20_1$, $20_2$, $20_3$, $20_n$ in FIG. 1 is illustrative only and does not constitute any limitation regarding the number of local space systems that may be included in environmental control system 10.

Local space system $20_1$ includes an air terminal device (ATD) $22_1$, a local control unit $24_1$ coupled with air terminal device $22_1$, a temperature sensor unit $26_1$, a user interface $28_1$ and a display unit $30_1$. An air terminal device (ATD) may sometimes be referred to as a variable air volume (VAV) unit or device. Air terminal device $22_1$ is coupled with master control unit 12. Air terminal device $22_1$ is controlled for some functions by master control unit 12 and is controlled for other functions by local control unit $24_1$. In prior art environmental control system 10 illustrated in FIG. 1, local control unit $24_1$ is co-located with air terminal device $22_1$. Temperature sensor unit $26_1$ indicates extant temperature in the monitored space (not shown in detail in FIG. 1) by a temperature-indicating signal provided to local control unit $24_1$. Local control unit $24_1$ controls air terminal device $22_1$ to vary air flow from duct system 16 to the space monitored by local space system $20_1$ according to a predetermined relation between a predetermined value or requirement and the temperature-indicating signal representing extant temperature in the monitored space. User interface $28_1$ and display unit $30_1$ cooperate to permit a user to vary the predetermined relationship or otherwise affect operation of air terminal device $22_1$, usually within certain predetermined limits.

Local space system $20_2$ includes an air terminal device $22_2$, a local control unit $24_2$ coupled with air terminal device $22_2$, a temperature sensor unit $26_2$, a user interface $28_2$ and a display unit $30_2$. Air terminal device $22_2$ is coupled with master control unit 12. Air terminal device $22_2$ is controlled for some functions by master control unit 12 and is controlled for other functions by local control unit $24_2$. Local control unit $24_2$ is co-located with an air terminal device $22_2$. Temperature sensor unit $26_2$ indicates extant temperature in the monitored space (not shown in detail in FIG. 1) by a temperature-indicating signal provided to local control unit $24_2$. Local control unit $24_2$ controls air terminal device $22_2$ to vary air flow from duct system 16 to the space monitored by local space system $20_2$ according to a predetermined relation between a predetermined value or requirement and the temperature-indicating signal representing extant temperature in the monitored space. A user interface $28_2$ and display unit $30_2$ cooperate to permit a user to vary the predetermined relationship or otherwise affect operation of air terminal device $22_2$, usually within certain predetermined limits.

Local space system $20_3$ includes an air terminal device $22_3$, a local control unit $24_3$ coupled with air terminal device $22_3$, a temperature sensor unit $26_3$, a user interface $28_3$ and a display unit $30_3$. Air terminal device $22_3$ is coupled with master control unit 12. Air terminal device $22_3$ is controlled for some functions by master control unit 12 and is controlled for other functions by local control unit $24_3$. Local control unit $24_3$ is co-located with air terminal device $22_3$. Temperature sensor unit $26_3$ indicates extant temperature in the monitored space (not shown in detail in FIG. 1) by a temperature-indicating signal provided to local control unit $24_3$. Local control unit $24_3$ controls air terminal device $22_3$ to vary air flow from duct system 16 to the space monitored by local space system $20_3$ according to a predetermined relation between a predetermined value or requirement and the temperature-indicating signal representing extant temperature in the monitored space. A user interface $28_3$ and display unit $30_3$ cooperate to permit a user to vary the predetermined relationship or otherwise affect operation of air terminal device $22_3$, usually within certain predetermined limits.

Local space system $20_n$ includes an air terminal device $22_n$, a local control unit $24_n$ coupled with air terminal device $22_n$, a temperature sensor unit $26_n$, a user interface $28_n$ and a display unit $30_n$. Air terminal device $22_n$ is coupled with master control unit 12. Air terminal device $22_n$ is controlled for some functions by master control unit 12 and is controlled for other functions by local control unit $24_n$. Local control unit $24_n$ is co-located with air terminal device $22_n$. Temperature sensor unit $26_n$ indicates extant temperature in the monitored space (not shown in detail in FIG. 1) by a temperature-indicating signal provided to local control unit $24_n$. Local control unit $24_n$ controls air terminal device $22_n$ to vary air flow from duct system 16 to the space monitored by local space system $20_n$ according to a predetermined relation between a predetermined value or requirement and the temperature-indicating signal representing extant temperature in the monitored space. A user interface $28_n$ and display unit $30_n$ cooperate to permit a user to vary the predetermined relationship or otherwise affect operation of air terminal device $22_n$, usually within certain predetermined limits.

Situating local control units $24_n$ in air terminal devices $22_n$ for responding to indicating signals from sensor units $26_n$ and user interfaces $28_n$ in conditioned spaces requires service personnel to access duct system 16 to perform maintenance actions on the local control units $24_n$. Such accessing of duct system 16 can be inconvenient, uncomfortable and awkward. Positioning local control units $24_n$ in air terminal devices $22_n$ also requires locating electronic control circuitry in at least two positions—in air terminal devices $22_n$ and in the conditioned space. Such a multiple sites for electronic circuitry can be costly and inefficient as compared to locating electronic units in a single location.

Figure 2:
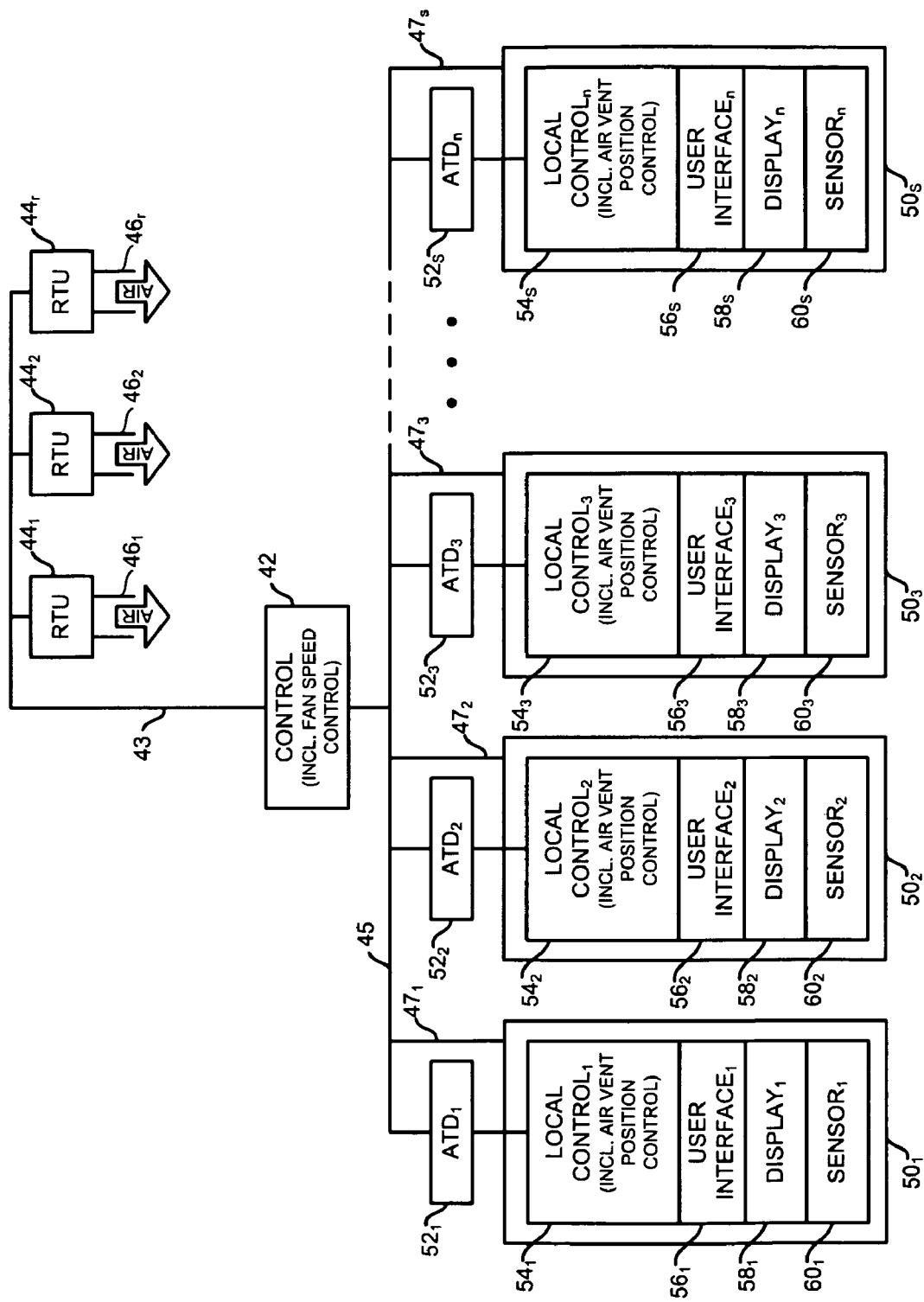
FIG. 2 is a schematic diagram of an environmental control system configured according to the teachings of the present invention.

FIG. 2 is a schematic diagram of an environmental control system configured according to the teachings of the present invention. In FIG. 2, an environmental control system 40 includes a master control unit 42 coupled via a network 43 with a plurality of Roof Top Units (RTU) $44_1$, $44_2$, $44_r$. The indicator "r" is employed to signify that there can be any number of RTUs in environmental control system 40. The inclusion of three RTUs $44_1$, $44_2$, $44_r$ in FIG. 2 is illustrative only and does not constitute any limitation regarding the number of RTUs that may be included in the environmental control system of the present invention. RTU $44_1$ is coupled with an air duct $46_1$ for distributing conditioned air among selected spaces conditioned by environmental control system 40. RTU $44_2$ is coupled with an air duct $46_2$ for distributing conditioned air among selected spaces conditioned by environmental control system 40. RTU 44$_r$ is coupled with an air duct 46$_r$ for distributing conditioned air among selected spaces conditioned by environmental control system 40. Connections of duct systems 46$_1$, 46$_2$, 46$_r$ with serviced spaces are not shown in detail in FIG. 2 but such connections are understood by those skilled in the art of environmental control system design.

Associated with each conditioned space served by environmental control system 40 is a local control apparatus 50$_1$, 50$_2$, 50$_3$, 50$_s$. Each local control apparatus 50$_s$ may be coupled with master control unit 42 via a network 45. The indicator "s" is employed to signify that there can be any number of local control apparatuses in environmental control system 40. The inclusion of four local control apparatuses 50$_1$, 50$_2$, 50$_3$, 50$_s$ in FIG. 2 is illustrative only and does not constitute any limitation regarding the number of local control apparatuses that may be included in the environmental control system of the present invention.

Conditioned spaces are not set out in detail in FIG. 2, but are within the understanding of one skilled in the art of environmental control system design. Each conditioned space is served by at least one air terminal device (ATD) unit, represented by air terminal devices 52$_1$, 52$_2$, 52$_3$, 52$_s$ in FIG. 2. Air terminal devices 52$_1$, 52$_2$, 52$_3$, 52$_s$ are coupled with master control unit 42 via network 45 for control of some functions such as, by way of example and not by way of limitation, fan speed control. Air terminal devices 52$_1$, 52$_2$, 52$_3$, 52$_s$ are coupled with local control apparatuses 50$_1$, 50$_2$, 50$_3$, 50$_s$ for control of other functions such as, by way of example and not by way of limitation, air vent position control.

Local control apparatus 50$_1$ is coupled with master control unit 42 via a network connection 47$_1$ and includes a local control unit 54$_1$ coupled with air terminal device 52$_1$, a user interface 56$_1$ and a display unit 58$_1$. At least one condition sensor unit is also included in local control apparatus 50$_1$, represented by condition sensor unit 60$_1$ in FIG. 2. Condition sensors may sense various conditions in the conditioned space including, by way of example and not by way of limitation, temperature, relative humidity, carbon dioxide level, motion. Condition sensor 60$_1$ indicates an extant condition in the monitored space (not shown in detail in FIG. 2) by a condition-indicating signal provided to local control unit 54$_1$. Local control unit 54$_1$ controls at least one function of air terminal device 52$_1$ to vary air flow from duct system 46 to the conditioned space monitored by local control apparatus 50$_1$ according to a predetermined relation between a predetermined value or requirement and the condition-indicating signal representing an extant condition in the conditioned space. User interface 56$_1$ and display unit 58$_1$ cooperate to permit a user to vary the predetermined relationship or otherwise affect operation of air terminal 52$_1$, usually within certain predetermined limits.

Local control apparatus 50$_2$ is coupled with master control unit 42 via a network connection 47$_2$ and includes a local control unit 54$_2$ coupled with air terminal device 52$_2$, a user interface 56$_2$ and a display unit 58$_2$. At least one condition sensor unit is also included in local control apparatus 50$_2$, represented by condition sensor unit 60$_2$ in FIG. 2. Condition sensors may sense various conditions in the conditioned space including, by way of example and not by way of limitation, temperature, relative humidity, carbon dioxide level, motion and other conditions. Condition sensor unit 60$_2$ indicates an extant condition in the monitored space (not shown in detail in FIG. 2) by a condition-indicating signal provided to local control unit 54$_2$. Local control unit 54$_2$ controls at least one function of air terminal device 52$_2$ to vary air flow from duct system 46 to the conditioned space monitored by local control apparatus 50$_2$ according to a predetermined relation between a predetermined value or requirement and the condition-indicating signal representing an extant condition in the conditioned space. User interface 56$_2$ and display unit 58$_2$ cooperate to permit a user to vary the predetermined relationship or otherwise affect operation of air terminal device 52$_2$, usually within certain predetermined limits.

Local control apparatus 50$_3$ is coupled with master control unit 42 via a network connection 47$_3$ and includes a local control unit 54$_3$ coupled with air terminal device 52$_3$, a user interface 56$_3$ and a display unit 58$_3$. At least one condition sensor unit is also included in local control apparatus 50$_3$, represented by condition sensor unit 60$_3$ in FIG. 2. Condition sensors may sense various conditions in the conditioned space including, by way of example and not by way of limitation, temperature, relative humidity, carbon dioxide level, motion and other conditions. Condition sensor unit 60$_3$ indicates an extant condition in the monitored space (not shown in detail in FIG. 2) by a condition-indicating signal provided to local control unit 54$_3$. Local control unit 54$_3$ controls at least one function of air terminal device 52$_3$ to vary air flow from duct system 46 to the conditioned space monitored by local control apparatus 50$_3$ according to a predetermined relation between a predetermined value or requirement and the condition-indicating signal representing an extant condition in the conditioned space. User interface 56$_3$ and display unit 58$_3$ cooperate to permit a user to vary the predetermined relationship or otherwise affect operation of air terminal device 52$_3$, usually within certain predetermined limits.

Local control apparatus 50$_s$ is coupled with master control unit 42 via a network connection 47$_s$ and includes a local control unit 54$_s$ coupled with air terminal device 52$_s$, a user interface 56$_s$ and a display unit 58$_s$. At least one condition sensor unit is also included in local control apparatus 50$_s$, represented by condition sensor unit 60$_s$ in FIG. 2. Condition sensors may sense various conditions in the conditioned space including, by way of example and not by way of limitation, temperature, relative humidity, carbon dioxide level, motion and other conditions. Condition sensor unit 60$_s$ indicates an extant condition in the monitored space (not shown in detail in FIG. 2) by a condition-indicating signal provided to local control unit 54$_s$. Local control unit 54$_s$ controls at least one function of air terminal device 52$_s$ to vary air flow from duct system 46 to the conditioned space monitored by local control apparatus 50$_s$ according to a predetermined relation between a predetermined value or requirement and the condition-indicating signal representing an extant condition in the conditioned space. User interface 56$_s$ and display unit 58$_s$ cooperate to permit a user to vary the predetermined relationship or otherwise affect operation of air terminal device 52$_s$, usually within certain predetermined limits.

Situating local control units 54$_s$ in local control apparatuses 50$_s$ for responding to indicating signals from sensor units 60$_s$ and user interfaces 56$_s$ in conditioned spaces permits service personnel convenient and comfortable access to local control units 54$_s$ for performing maintenance actions on the local control units 54$_s$. Positioning local control units 54$_s$ in local control apparatuses 50$_s$ also permits locating electronic control circuitry in a single position in the conditioned space. Such a single sites arrangement for electronic circuitry can reduce cost and increase efficiency of operation.

Figure 3:
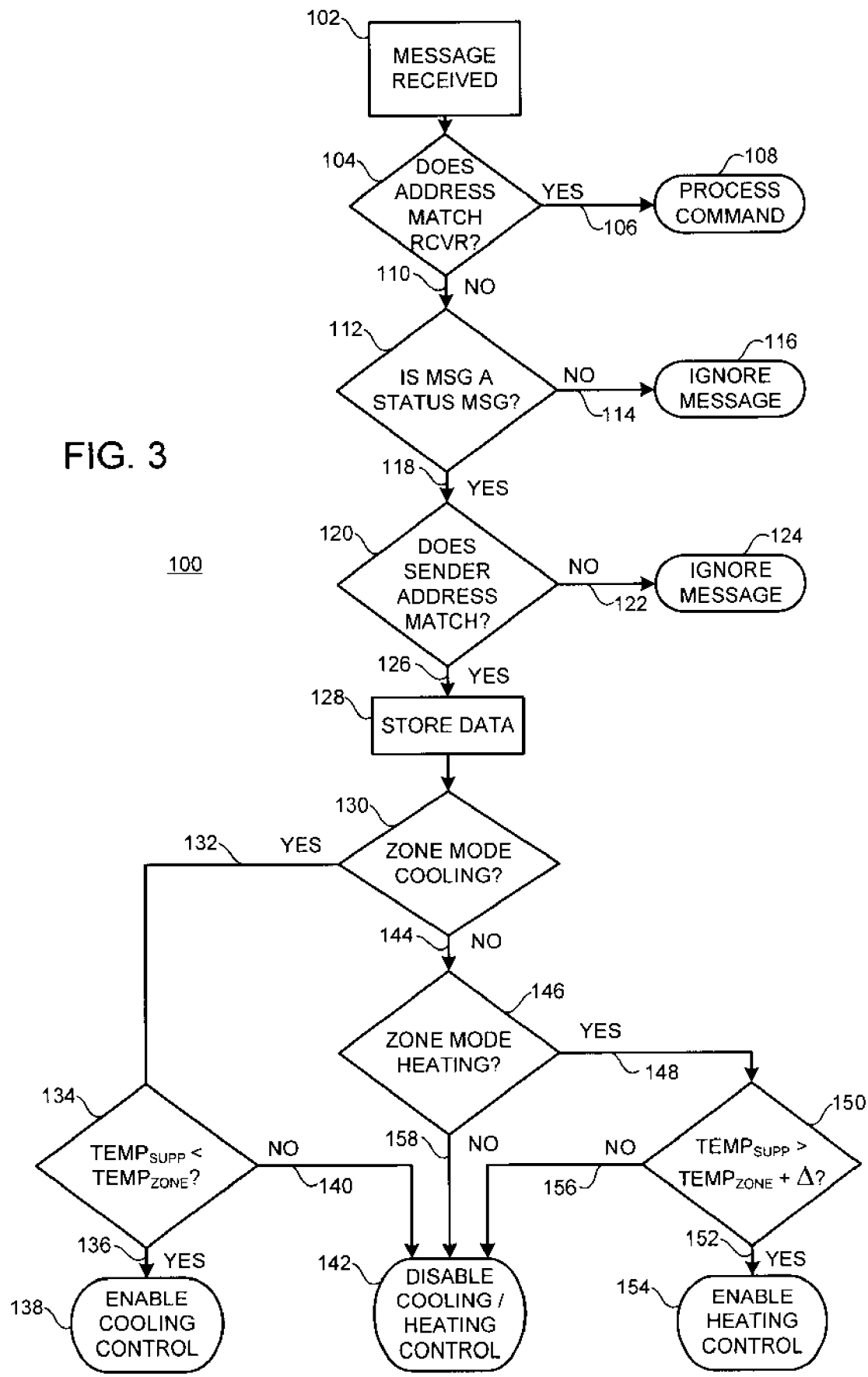
FIG. 3 is a flow chart illustrating operation of an environmental control system in an eavesdrop mode.

FIG. 3 is a flow chart illustrating operation of an environmental control system in an eavesdrop mode. In FIG. 3, an eavesdrop mode process 100 begins when a message is monitored and received as indicated by a block 102. Eavesdrop mode process 100 is a process by which a listening network unit may listen in on a network communication line for messages destined or intended for another unit, but which may affect or require action by the listening network unit. Receipt of a message (block 102) may, by way of example and not by way of limitation, occur by a monitoring of message traffic by a local control apparatus $50_s$ on network 45 via a network connection $47_s$ (FIG. 2). Process 100 continues by posing a query whether the "TO" address of the monitored message matches the address of the listening network unit, or receiving unit, (e.g., a receiving local apparatus $50_s$; FIG. 2), as indicated by a query block 104. If the "TO" address of the monitored message matches the address of the receiving unit, process 100 proceeds from query block 104 via a YES response line 106 and the command contained in the monitored message is processed, as indicated by a process block 108. If the "TO" address of the monitored message does not match the address of the receiving unit, process 100 proceeds from query block 104 via a NO response line 110 and process 100 poses a query whether the monitored message is a status message (i.e., a type of message to which the receiving unit should respond regardless of the "TO" address of the monitored message), as indicated by a query block 112.

If the monitored message is a status message, process 100 proceeds from query block 112 via a YES response line 114 and the command contained in the monitored message is processed, as indicated by a process block 116. If the monitored message is not a status message, process 100 proceeds from query block 112 via a NO response line 118 and process 100 poses a query whether the "FROM" address of the monitored message matches a network unit to which the receiving unit may have to respond, as indicated by a query block 120. If the "FROM" address of the monitored message does not match a network unit to which the receiving unit may have to respond, process 100 proceeds from query block 120 via a NO response line 122 and the message is ignored, as indicated by a process block 124. If the "FROM" address of the monitored message matches a network unit to which the receiving unit may have to respond, process 100 proceeds from query block 120 via a YES response line 126 and appropriate data contained in the monitored message is stored, as indicated by a block 128.

Process 100 continues by posing a query whether the zone associated with the receiving unit is in a cooling mode, as indicated by a query block 130. If the zone is in a cooling mode, process 100 proceeds from query block 130 via a YES response line 132 and poses a query whether the supplied temperature, $TEMP_{SUPP}$, is less than the extant temperature in the zone, $TEMP_{ZONE}$, as indicated by a query block 134. If the supplied temperature $TEMP_{SUPP}$ is less than the extant temperature in the zone $TEMP_{ZONE}$, process 100 proceeds from query block 134 via a YES response line 136 and cooling control of the zone is enabled, as indicated by a process block 138. If the supplied temperature $TEMP_{SUPP}$ is not less than the extant temperature in the zone $TEMP_{ZONE}$, process 100 proceeds from query block 134 via a NO response line 140 and temperature control of the zone is disabled, as indicated by a process block 142.

If the zone is not in a cooling mode, process 100 proceeds from query block 130 via a NO response line 144 and poses a query whether the zone associated with the receiving unit is in a heating mode, as indicated by a query block 146. If the zone associated with the receiving unit is in a heating mode, process 100 proceeds from query block 146 via a YES response line 148 and poses a query whether the supplied temperature $TEMP_{SUPP}$ is greater than the extant temperature in the zone plus a differential value $\Delta$, $TEMP_{ZONE}+\Delta$, as indicated by a query block 150.

If the supplied temperature $TEMP_{SUPP}$ is greater than the extant temperature in the zone plus a differential value $\Delta$, $TEMP_{ZONE}+\Delta$, process 100 proceeds from query block 150 via a YES response line 152 and heating control of the zone is enabled, as indicated by a process block 154. If the supplied temperature $TEMP_{SUPP}$ is not greater than the extant temperature in the zone plus a differential value $\Delta$, $TEMP_{ZONE}+\Delta$, process 100 proceeds from query block 150 via a NO response line 156 and temperature control of the zone is disabled, as indicated by process block 142.

If the zone associated with the receiving unit is not in a heating mode, process 100 proceeds from query block 146 via a NO response line 158 and temperature control of the zone is disabled, as indicated by process block 142.

Figure 4:
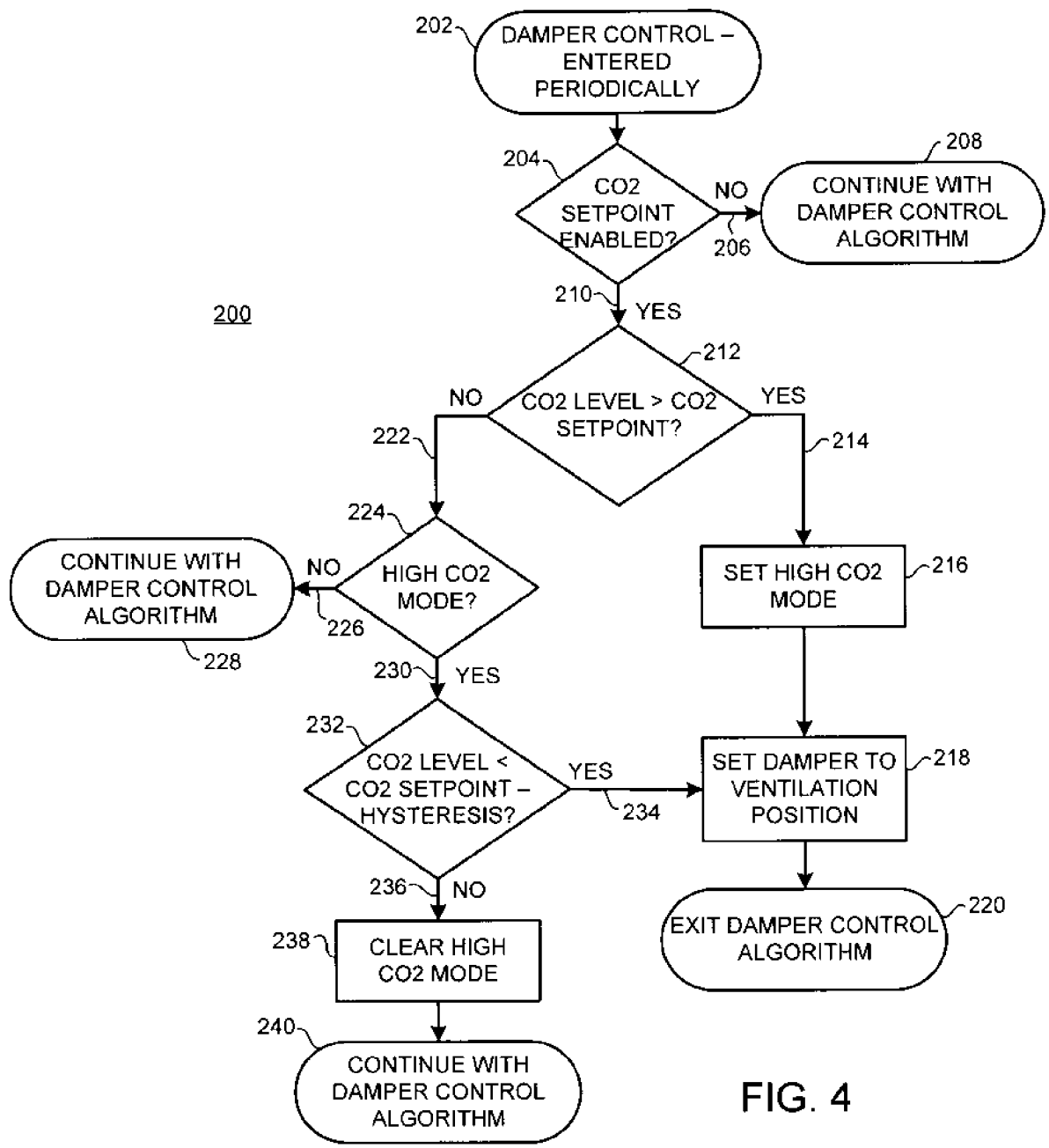
FIG. 4 is a flow chart illustrating operation of an apparatus of the present invention to control a representative environmental condition in a space.

FIG. 4 is a flow chart illustrating operation of an apparatus of the present invention to control a representative environmental condition in a space. In FIG. 4, a control process 200 begins with a periodic entering of damper control information, as indicated by a process block 202. Process 200 continues by posing a query whether a carbon dioxide ($CO_2$) set point has been established or enabled for the space or zone, as indicated by a query block 202.

If a $CO_2$ set point has not been enabled for the space, process 200 proceeds from query block 204 via a NO response line 206 and damper control continues using the presently employed damper control algorithm, as indicated by a block 208. If a $CO_2$ set point has been enabled for the space, process 200 proceeds from query block 204 via a YES response line 210 and a query is posed whether the $CO_2$ level in the space is greater than the $CO_2$ set point, as indicated by a query block 211.

If the $CO_2$ level in the space is greater than the $CO_2$ set point, process 200 proceeds from query block 212 via a YES response line 214 and a high $CO_2$ operation mode is set, as indicated by a block 216. Process 200 continues by setting a damper serving the space to a ventilation position (as indicated by a block 218) and the presently employed damper control algorithm is exited or discontinued, as indicated by a process block 220. If the $CO_2$ level in the space is not greater than the $CO_2$ set point, process 200 proceeds from query block 212 via a NO response line 222 and poses a query whether the high $CO_2$ operation mode is set, as indicated by a query block 224. If the high $CO_2$ operation mode is not set, process 200 proceeds from query block 224 via a NO response line 226 and damper control continues using the presently employed damper control algorithm, as indicated by a block 228. If the high $CO_2$ operation mode is set, process 200 proceeds from query block 224 via a YES response line 230 and poses a query whether the $CO_2$ level in the space is less than the $CO_2$ set point minus a hysteresis value, as indicated by a query block 232.

If the $CO_2$ level in the space is less than the $CO_2$ set point minus a hysteresis value, process 200 proceeds from query block 232 via a YES response line 234, sets a damper serving the space to a ventilation position (as indicated by a block 218) and the presently employed damper control algorithm is exited or discontinued, as indicated by a process block 220. If the $CO_2$ level in the space is not less than the $CO_2$ set point minus a hysteresis value, process 200 proceeds from query block 232 via a NO response line 236, the high $CO_2$ mode is cleared (as indicated by a block 238) and the damper continues to be controlled by the presently employed damper control algorithm, as indicated by a process block 240.

Figure 5:
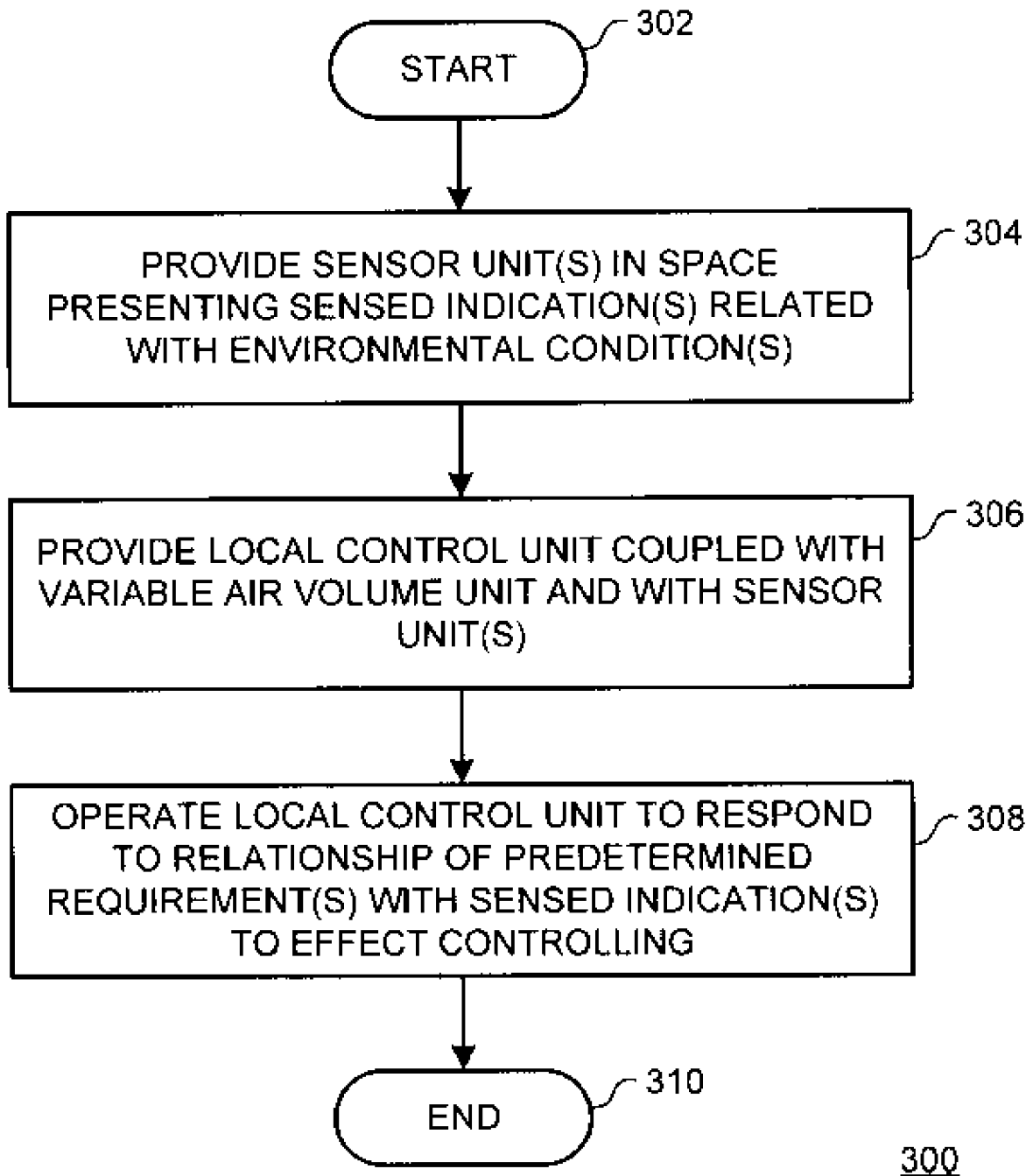
FIG. 5 is a flow chart illustrating the method of the present invention.

FIG. 5 is a flow chart illustrating the method of the present invention. In FIG. 5, a method 300 for controlling an air terminal device to affect at least one environmental condition in a space begins at a START locus 302. Method 300 continues by providing at least one sensor unit in the space, as indicated by a block 304. The at least one sensor unit presents at least one sensed indication related with at least one respective environmental condition of the at least one environmental condition. Method 300 continues by providing a local control unit coupled with the air terminal device and coupled with at least one respective sensor unit of the at least one sensor unit, as indicated by a block 306. Method 300 continues by operating the local control unit to respond to a relationship of at least one predetermined requirement with the at least one sensed indication to effect the controlling, as indicated by a block 308. Method 300 terminates at an END locus 310.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A local control apparatus, comprising:
   at least one condition sensor unit, each configured to sense an extant condition of a selected space corresponding to an air terminal device, said selected space coupled to an air duct from one of a plurality of air conditioning units, said at least one condition sensor unit configured to indicate said extant condition of said selected space; and
   a local control unit coupled to a corresponding said air terminal device and coupled via a second network to a master control unit which is coupled via a first network to said plurality of air conditioning units, said local control unit configured to control at least one function of said corresponding said air terminal device based on said indication of said extant condition of said selected space and said master control unit configured to control at least one other function of said corresponding said air terminal device.

2. The local control apparatus as recited in claim 1 wherein the local control unit controls said air terminal device according to a predetermined relation between a predetermined value and said extant condition.

3. The location control apparatus as recited in claim 2 wherein a user interface permits a user to vary said predetermined relation and said predetermined value.

4. The location control apparatus as recited in claim 3 wherein a display unit cooperates with said user interface to permit said user to vary said predetermined relation and said predetermined value.

5. The location control apparatus as recited in claim 1 wherein said extant condition is selected from the group consisting of temperature, relative humidity, carbon dioxide level, and motion.

6. A method, comprising:
   sensing, by a condition sensing unit of a local control apparatus, at least one extant condition in a selected space;
   indicating, by said condition sensing unit, said at least one extant condition in said selected space;
   controlling, by a local control unit of said local control apparatus, at least one function of an air terminal device based on said at least one extant condition; and
   controlling, by a master control unit coupled to both said local control apparatus via a second network and a plurality of air conditioning units via a first network, at least one other function of said air terminal device, said air terminal device configured to condition said selected space in cooperation with said plurality of air conditioning units.

7. The method as recited in claim 6 further comprising controlling, by said local control unit, said at least one function of said air terminal device according to a predetermined relation between a predetermined value and said extant condition.

8. The method as recited in claim 7 wherein a user varies, with a user interface of said local control apparatus, said predetermined relation and said predetermined value.

9. The method as recited in claim 8 further comprising displaying, with a display unit of said local control apparatus, said predetermined relation, said predetermined value, and said at least one extant condition.

10. The method as recited in claim 6 wherein said at least one extant condition is selected from the group consisting of temperature, relative humidity, carbon dioxide level, and motion.

11. An environmental control system, comprising:
    a plurality of air conditioning units, each coupled to an air duct for distributing conditioned air among selected spaces;
    a master control unit coupled via a first network to said plurality of air conditioning units;
    a plurality of air terminal devices, each serving a corresponding one of said selected spaces and coupled via a second network to said master control unit wherein said master control unit controls some functions of said plurality of air terminal devices; and
    a plurality of local control apparatuses, each associated with said corresponding one of said selected spaces and with a corresponding one of said plurality of air terminal devices and each coupled to said master control unit via said second network wherein said each of said local control apparatuses controls other functions of said corresponding one of said plurality of air terminal devices, each of said plurality of local control apparatuses including:
       at least one condition sensor unit, each configured to sense a condition of said corresponding one of said selected spaces and configured to indicate an extant condition of said corresponding one of said selected spaces; and
       a local control unit coupled to said corresponding one of said plurality of air terminal devices and coupled via said second network to said master control unit, said local control unit configured to control at least one of said other functions of said corresponding one of said plurality of air terminal devices based on said indication of said extant condition of said corresponding one of said selected spaces in cooperation with said master control unit.

12. The environmental control system as recited in claim 11 wherein the local control unit controls said air terminal device according to a predetermined relation between a predetermined value and said extant condition.

13. The environmental control system as recited in claim 12 wherein a user interface permits a user to vary said predetermined relation and said predetermined value.

14. The location control apparatus as recited in claim 13 wherein a display unit cooperates with said user interface to permit said user to vary said predetermined relation and said predetermined value.

15. The location control apparatus as recited in claim 11 wherein said extant condition is selected from the group consisting of temperature, relative humidity, carbon dioxide level, and motion.

* * * * *